US011525698B2

United States Patent
Bahrami et al.

(10) Patent No.: US 11,525,698 B2
(45) Date of Patent: *Dec. 13, 2022

(54) ENHANCED VEHICLE OPERATION

(71) Applicant: Ford Global Technologies, LLC, Dearborn, MI (US)

(72) Inventors: Mohsen Bahrami, Troy, MI (US); Navid Tafaghodi Khajavi, Troy, MI (US); Hamed Asadi, Troy, MI (US); Praveen Kumar Yalavarty, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/881,424

(22) Filed: May 22, 2020

(65) Prior Publication Data
US 2021/0366290 A1 Nov. 25, 2021

(51) Int. Cl.
*G01C 21/32* (2006.01)
*G01C 21/00* (2006.01)

(52) U.S. Cl.
CPC ......... *G01C 21/3889* (2020.08); *G01C 21/32* (2013.01); *G01C 21/38* (2020.08);
(Continued)

(58) Field of Classification Search
CPC ............ G01C 21/3859; G01C 21/3889; G01C 21/32; G01C 21/38; G01C 21/3863; G01C 21/3885
See application file for complete search history.

(56) References Cited

U.S. PATENT DOCUMENTS

| 11,248,916 B2 * | 2/2022 | Bahrami | G01C 21/3889 |
| 2014/0199980 A1 * | 7/2014 | Rao | H04W 4/029 |
| | | | 455/418 |

(Continued)

FOREIGN PATENT DOCUMENTS

| EP | 1121675 B1 | 4/2006 |
| JP | 2002328598 A | 11/2002 |

(Continued)

OTHER PUBLICATIONS

Ho et al., Efficient 3D Road Map Data Exchange for Intelligent Vehicles in Vehicular Fog Networks, Dec. 31, 2019 (Date of Publication on IEEE Xplore), IEEE, IEEE Transactions on Vehicular Technology, vol. 69, Issue 3 (Year: 2019).*

(Continued)

*Primary Examiner* — Nadeem Odeh
(74) *Attorney, Agent, or Firm* — Frank A. MacKenzie; Bejin Bieneman PLC

(57) ABSTRACT

A computer is programmed to allocate respective connectivity quality data of a geographic area to a first map or a second map. The computer is further programmed to assign one of a plurality of subsets of the first map and one of a plurality of subsets of the second map to a first vehicle, identify respective locations of the first and second vehicles and one of the first or second maps that includes the locations of the first and second vehicles. The computer is further programmed to send, to the first and second vehicles, a map dataset that is a result of applying an XOR function to (1) the subset of the identified map that includes the location of the first vehicle assigned to the first vehicle and (2) the subset of the identified map that includes the location of the second vehicle assigned to the second vehicle.

20 Claims, 5 Drawing Sheets

(52) U.S. Cl.
CPC ..... *G01C 21/3859* (2020.08); *G01C 21/3863* (2020.08); *G01C 21/3885* (2020.08)

(56) References Cited

U.S. PATENT DOCUMENTS

| | | |
|---|---|---|
| 2018/0189323 A1 | 7/2018 | Wheeler |
| 2019/0265045 A1 | 8/2019 | Baik et al. |
| 2020/0084193 A1 | 3/2020 | Beaurepaire et al. |
| 2021/0063168 A1 | 3/2021 | Rolf et al. |

FOREIGN PATENT DOCUMENTS

| | | |
|---|---|---|
| JP | 4902463 B2 | 3/2012 |
| JP | 6416948 B2 | 10/2018 |

OTHER PUBLICATIONS

Non-Final Office Action dated Aug. 3, 2021 re U.S. Appl. No. 16/750,628, filed Jan. 23, 2020.

\* cited by examiner

ENHANCED VEHICLE OPERATION

BACKGROUND

Vehicles can include map data stored in a memory of a vehicle computer. The map data can include, e.g., geo-coordinate data (e.g., GPS data), data about roadway markings, data about landmarks, etc. Map data can consume significant amounts of computer memory storage. A vehicle computer memory storage can be insufficient for map data needed or desired to support vehicle route planning and/or navigation. Further, network resources to transfer map data to a vehicle computer can be unavailable, inefficient, and/or limited.

DETAILED DESCRIPTION

Figure 1:
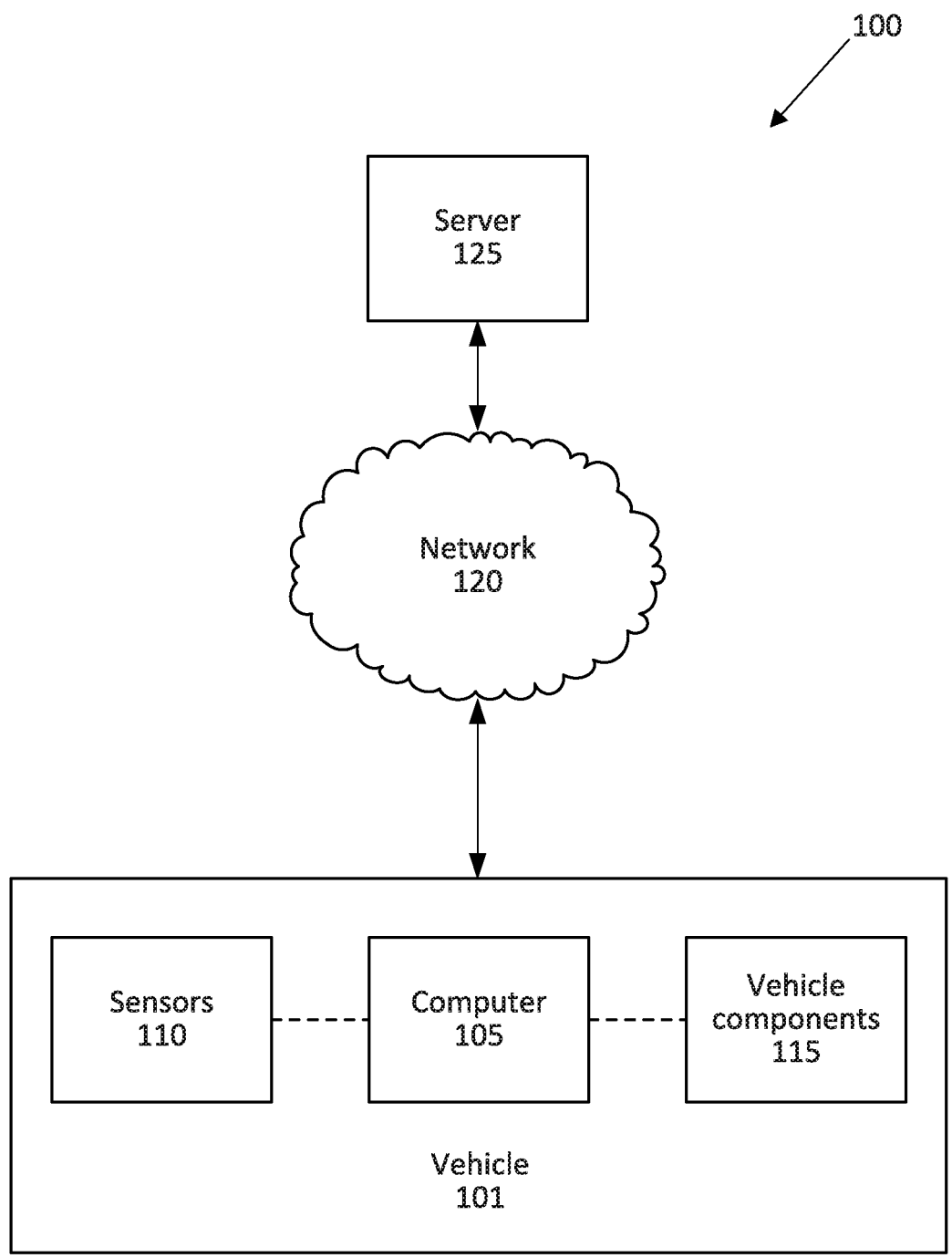
FIG. 1 is a diagram of a system for operating a vehicle.

A system includes a computer including a processor and a memory, the memory storing instructions executable by the processor to allocate respective connectivity quality data of a geographic area to a first map or a second map, the connectivity quality data including rates of data transmission of a communications network at a plurality of locations in the geographic area or a number of wireless network access points in the geographic area, the first and second maps each describing a portion of the geographic area in which the connectivity quality data are within a predetermined range, assign one of a plurality of subsets of the first map and one of a plurality of subsets of the second map to a first vehicle, each subset including some but not all of the data of the respective map, assign a different one of the plurality of subsets of the first map and a different one of the plurality of subsets of the second map to a second vehicle, identify a location of the first vehicle, a location of the second vehicle, one of the first or second maps that includes the location of the first vehicle, and one of the first or second maps that includes the location of the second vehicle, and send, to the first vehicle and the second vehicle, a map dataset that is a result of applying an XOR function to (1) the subset of the identified map that includes the location of the first vehicle assigned to the first vehicle and (2) the subset of the identified map that includes the location of the second vehicle assigned to the second vehicle.

The connectivity quality data can include rates of data transmission of a second communications network, and the instructions further include instructions to send the map dataset based on the connectivity quality data of the one of the communications network or the second communications network having a higher average rate of data transmission than the other of the communications network or the second communications network.

The first vehicle can include a vehicle computer programmed to apply the XOR function to the map dataset and the assigned subset of the identified map that includes the location of the first vehicle and the assigned subsets of the first map and the second map stored in the vehicle computer, to recover the data of the first map or the data of the second map.

The vehicle computer can be further programmed to actuate at least one of a propulsion, a brake, or a steering to move the first vehicle according to the recovered first map or the recovered second map.

The output of applying the XOR function of the map dataset and the assigned subset of the identified map that includes the location of the first vehicle can be a different subset of the identified map that includes the location of the first vehicle, and the vehicle computer can be further programed to combine the assigned subset and the different subset to recover the first map or the second map.

The second vehicle can include a second vehicle computer programmed to apply the XOR function to the map dataset and the assigned subset of the map that includes the location of the second vehicle.

A data size of the map dataset can be smaller than a respective data size of the data of the first map or the data of the second map.

A combined data size of the assigned subset of the first map and the assigned subset of the second map and the map dataset can be smaller than a combined data size of the data of the first map and the data of the second map.

A bandwidth consumption to transmit the map dataset can be smaller than a respective bandwidth consumption to transmit the first map or the second map.

The instructions can further include instructions to determine a new location of the first vehicle and a new location of the second vehicle and to send a second map dataset that is output from applying the XOR function to (1) the subset of the identified map that includes the new location of the first vehicle and (2) the subset of the identified map that includes the new location of the second vehicle.

A size of the portion of the geographic area of the first map can be based on the connectivity quality data of the geographic area.

The number of wireless network access points in the first map can be fewer than the number of wireless network access points of the second map, and the size of the portion of the geographic area of the first map is greater than a size of the portion of the geographic area of the second map.

A method includes allocating respective connectivity quality data of a geographic area to a first map or a second map, the connectivity quality data including rates of data transmission of a communications network at a plurality of locations in the geographic area or a number of wireless network access points in the geographic area, the first and second maps each describing a portion of the geographic area in which the connectivity quality data are within a predetermined range, assigning one of a plurality of subsets of the first map and one of a plurality of subsets of the second map to a first vehicle, each subset including some but not all of the data of the respective map, assigning a different one of the plurality of subsets of the first map and a different one of the plurality of subsets of the second map to a second vehicle, identifying a location of the first vehicle, a location of the second vehicle, one of the first or second maps that includes the location of the first vehicle, and one of the first or second maps that includes the location of the second vehicle; and sending, to the first vehicle and the second vehicle, a map dataset that is a result of applying an XOR function to (1) the subset of the identified map that includes the location of the first vehicle assigned to the first vehicle and (2) the subset of the identified map that includes the location of the second vehicle assigned to the second vehicle.

The method can further include applying the XOR function to the map dataset and the assigned subset of the identified map that includes the location of the first vehicle and the assigned subsets of the first map and the second map stored in the vehicle computer to recover the data of the first map or the data of the second map.

The method can further include actuating at least one of a propulsion, a brake, or a steering to move the first vehicle according to the recovered first map or the recovered second map.

The output of applying the XOR function of the map dataset and the assigned subset of the identified map that includes the location of the first vehicle can be a different subset of the identified map that includes the location of the first vehicle, and the method can further include combining the assigned subset and the different subset to recover the first map or the second map.

The method can further include applying the XOR function to the map dataset and the assigned subset of the map that includes the location of the second vehicle.

The method can further include determining a new location of the first vehicle and a new location of the second vehicle and to send a second map dataset that is output from applying the XOR function to (1) the subset of the identified map that includes the new location of the first vehicle and (2) the subset of the identified map that includes the new location of the second vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Connectivity map data may consume significant computing and/or network resources to transmit from a central server over a wireless network including, e.g., a cellular network. Memory limitations on a vehicle computer, such as cache size and memory space, limit an amount of map data that the vehicle computer can store. These connectivity limitations and local memory constraints limit the transmission and use of connectivity maps useful and/or necessary for vehicle operation.

By allocating connectivity maps into subsets, assigning fewer than all subsets to each of a plurality of vehicles, and using the locations of respective vehicles to specify which additional subsets to transmit to each vehicle, a system as disclosed herein can reduce data transmission over the network and improve memory storage efficiency for vehicle computers. Transmitting the subsets as exclusive disjunctions (as further explained below) allows a server to transmit less data over the network than otherwise required and allows the vehicle computers to recover missing subsets to complete the connectivity map for their current location. This improvement in network and memory efficiency further advantageously provides faster navigation operation for autonomous vehicles.

FIG. 1 illustrates an example system 100 for operating a vehicle 101. A computer 105 in the vehicle 101 is programmed to receive collected data from one or more sensors 110. For example, vehicle 101 data may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. For example, the computer 105 can be a generic computer with a processor and memory as described above and/or may include a dedicated electronic circuit including an ASIC that is manufactured for a particular operation, e.g., an ASIC for processing sensor data and/or communicating the sensor data. In another example, computer 105 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 105.

In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the vehicle 101, e.g., over a CAN bus, a wireless network, etc. Alternatively or additionally, the memory can be part of the computer 105, e.g., as a memory of the computer 105.

Sensors 110 can include a variety of devices. For example, various controllers in a vehicle 101 may operate as sensors 110 to provide data via the vehicle 101 network or bus, e.g., data relating to vehicle speed, acceleration, location, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers.

Collected data can include a variety of data collected in a vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data.

The vehicle 101 can include a plurality of vehicle components 115. In this context, each vehicle component 115 includes one or more hardware components adapted to perform a mechanical function or operation—such as moving the vehicle 101, slowing or stopping the vehicle 101, steering the vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 115 can include computing devices, e.g., electronic control units (ECUs) or the like and/or computing devices such as described above with respect to the computer 105, and that likewise communicate via a vehicle 101 network.

A vehicle 101 can operate in one of a fully autonomous mode, a semiautonomous mode, or a non-autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a processor and a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
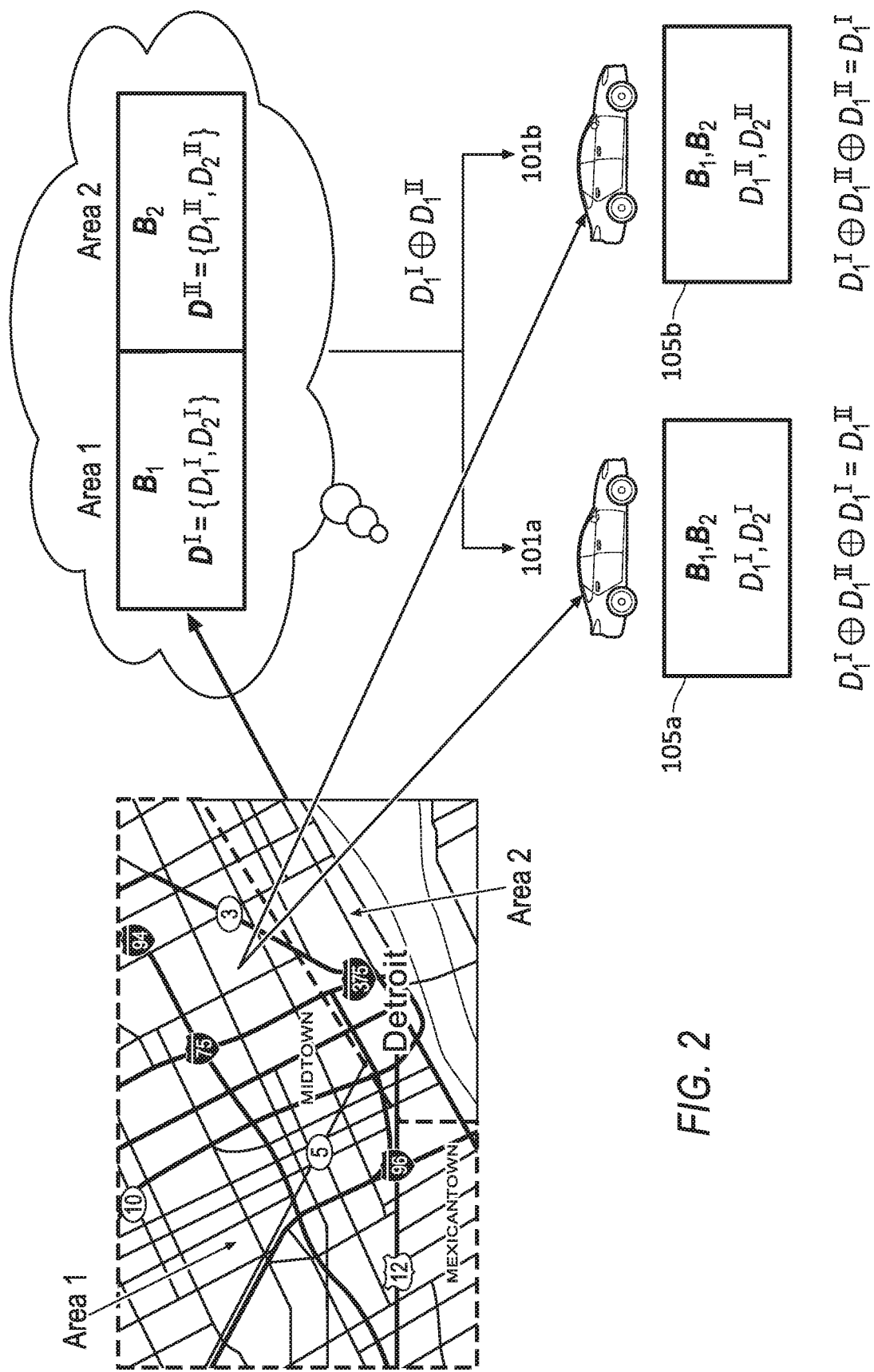
FIG. 2 is a diagram of an example connectivity map.

FIG. 2 is a view of a first geographic area and a second geographic area. In the Figures, the first geographic area is identified as "Area 1," and the second geographic area is identified as "Area 2." The first and second geographic areas can be divisions of a municipality, e.g., a city, a county, a state, etc. The server 125 can include maps of the first and second geographic areas. A "map" or "map dataset" in the context of this disclosure is a set of data, i.e., a plurality of bits encoding information, that includes information about a specific geographic area. For example, a map dataset (or a subset thereof) could be stored in what is conventionally referred to as a file or data file.

The data in the map can include connectivity quality data. In this context, "connectivity quality data" is data describing a measure of a connection between the computer 105 and the network 120 e.g., a rate of data transmission of a communications network such as a cellular network, a number of wireless network access points, as described below, etc. The map can be a portion of the municipality in which the rate of data transmission for a specific communications network is within a predetermined range of transmission rates. The "predetermined range" in this context is a range of data transmission rates that a manufacturer and/or a network administrator can determine to define the maps, e.g., a contiguous geographic area with a rate of data transmission below 1 megabit/second (MBPS) can define a first map and a second contiguous geographic area with a rate of data transmission greater than 1 MBPS and less than 10 MBPS can define a second map. The server 125 can allocate respective connectivity quality data of a geographic area to a first map or a second map, the first and second maps each describing a portion of the geographic area in which the connectivity quality data are within a predetermined range. A map with connectivity quality data is a "connectivity map."

The server 125 an identify respective sets of maps for each communications network. That is, respective maps for each communications network can include different geographic areas. For example, two geographic locations can be in one of the maps of a first communications network and in two different maps of a second communications network based on the respective average rates of data transmission of the first and second communications networks at the geographic locations. An "average" rate of data transmission is a mean rate of data transmission of a predetermined number of geographic locations in the geographic area over a predetermined period of time, the predetermined number and the predetermined period of time each selected by, e.g., a manufacturer, a network carrier, etc. For example, the server 125 can receive the average rate of data transmission for each communications network from each network carrier, and the server 125 can transmit the average rates of data transmission for the communications networks in the geographic area to the computer 105 over the network 120. The computer 105 can identify a current location of the vehicle 101 and a communications network with a highest average rate of data transmission. The computer 105 can request a subset of a connectivity map, as described below, of the communications network with the highest rate of data transmission at the identified location. Thus, the computer 105 can communicate over the communications network with the highest average rate of data transmission at any identified location.

Figure 3:
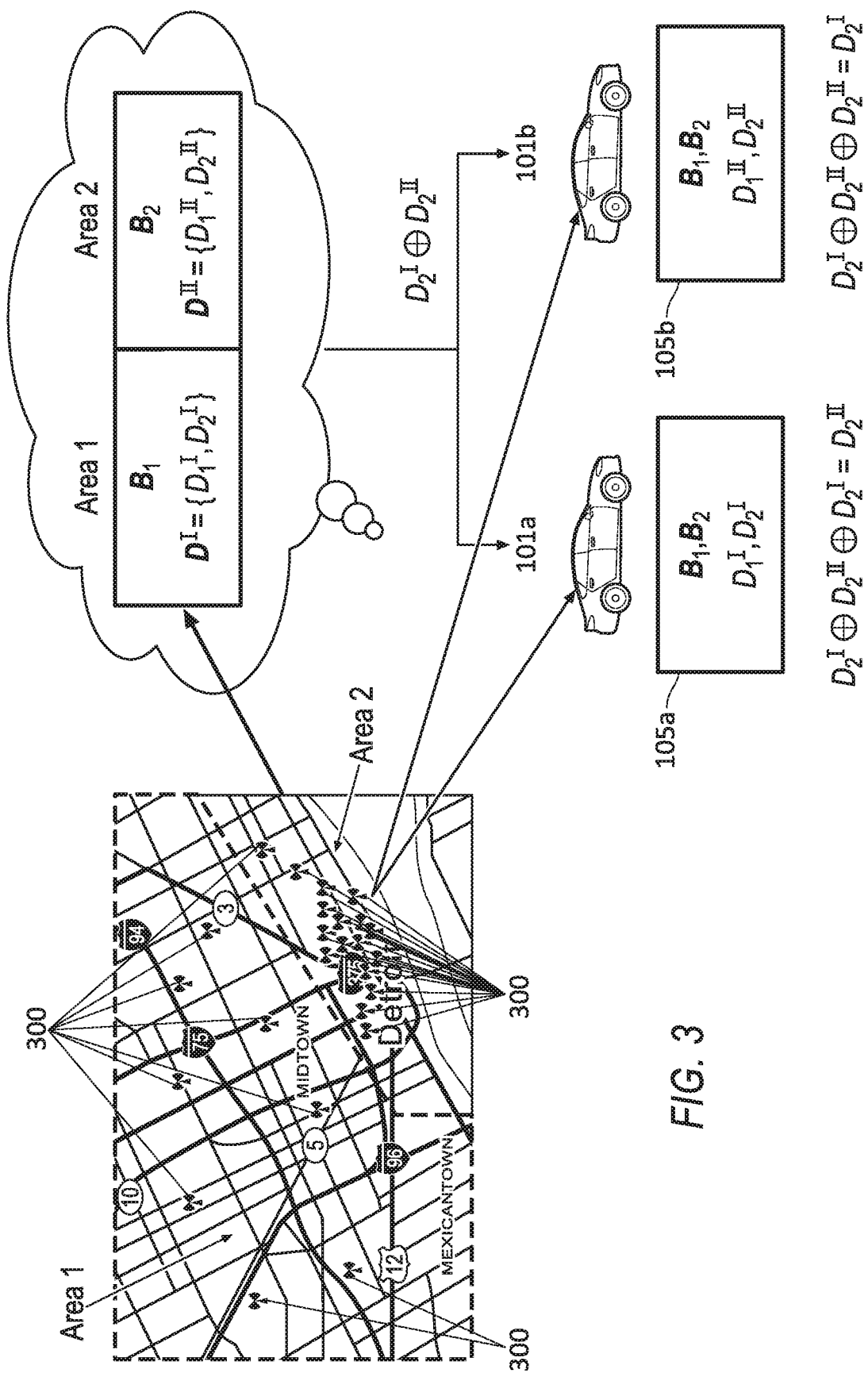
FIG. 3 is a diagram of another example connectivity map.

As described above, the connectivity quality data can be a number of wireless network access points 300, as shown in FIG. 3. A "wireless network access point" is a device that bridges wireless and wired communications and as such allows computers 105 and/or portable devices to access the network 120 when the computer 105 and/or the portable devices are within a broadcast range of the wireless network access point 300. The "broadcast range" is a maximum distance from the wireless network access point 300 that the wireless network access point 300 can provide data to a computer 105. For example, the wireless network access point 300 can be a WiFi network device. The map can be for a geographic area in which a predetermined density of wireless network access points 300 is located. A "density" is a number of wireless network access points 300 within a specified area, e.g., 10 square meters. For example, as shown in FIG. 3, Area 1 is a larger geographic area than Area 2, and because the density of the wireless network access points 300 is higher in Area 2 than in Area 1, the number of wireless network access points in Area 1 is fewer than the number of wireless network access points in Area 2. In a first geographic area, the vehicle 101 can pass by more wireless network access points 300 than in a second geographic area with a lower density of wireless network access points 300, and the computer 105 can receive data from each wireless network access point 300. Each time the computer 105 communicates with a wireless network access point 300, the computer 105 can receive a map subset over the network 120, as described below. The computer 105 typically receives data more frequently in areas of higher wireless network access point 300 density. Therefore, to reduce overall data transmission and bandwidth use a geographic area with the density of wireless network access points 300 should be smaller than a geographic area with a lower density of wireless network access points 300.

FIG. 2 shows a first map $D_1$ for the first geographic area and a second map $D_2$ for the second geographic area, the maps $D_1$, $D_2$ being connectivity maps including rates of data transmission for a communications network within respective predetermined ranges. The server 125 can divide the maps $D_1$, $D_2$ into a plurality of subsets. Each subset includes some but not all data of the respective map $D_1$, $D_2$ from which the subset is generated. That is, the plurality of subsets divided from the first map $D_1$ comprise all data of the first map $D_1$. By dividing the maps $D_1$, $D_2$ into a plurality of subsets, a plurality of vehicles 101 can each store one of the subsets for each map $D_1$, $D_2$ on a respective vehicle computer 105, and the server 125 can provide the other subsets for the maps $D_1$, $D_2$ over the network 120. For example, the server 125 can divide the map $D_1$ into two subsets $D_1^I$, $D_1^{II}$, i.e., the server 125 can divide the binary data of the map $D_1$ into the two subsets $D_1^I$ and $D_1^{II}$.

The server 125 can generate a map that is an exclusive disjunction of two subsets $D_1^I$, $D_1^{II}$. An "exclusive disjunction" is the result of applying an exclusive OR function (an "XOR" function) to two subsets including binary data. That is, the XOR function (represented with the $\oplus$ symbol) receives as input two binary values and outputs a 1 if the inputs are different and a 0 if the inputs are the same:

TABLE 1

| Input 1 ($I_1$) | Input 2 ($I_2$) | XOR Output ($I_1 \oplus I_2$) |
|---|---|---|
| 1 | 1 | 0 |
| 1 | 0 | 1 |
| 0 | 1 | 1 |
| 0 | 0 | 0 |

Because the subsets $D_1^I$, $D_1^{II}$ are sets of binary digits, the exclusive disjunction of the subsets $D_1^I \oplus D_1^{II}$ is a set of data, i.e., a "dataset," including the output of performing the XOR function on each pair of binary digits from the subsets $D_1^I$, $D_1^{II}$. For example, the dataset can be a file, i.e., a collection of data stored in the server 125 and/or the memory of the computer 105. That is, the exclusive disjunction of the subsets $D_1^I \oplus D_1^{II}$ is a set of binary digits encoding which digits differ between the subsets $D_1^I$, $D_1^{II}$. Thus, if a computer 105 includes one of the subsets, e.g., the subset $D_1^I$, the computer 105 can recover the other subset $D_1^{II}$ from the map dataset $D_1^I \oplus D_1^{II}$. That is, the computer 105 can generate the subset $D_1^{II}$ as $D_1^{II} = (D_1^I \oplus D_1^{II}) \oplus D_1^I$, i.e., the exclusive disjunction of the stored subset $D_1^I$ and the dataset $D_1^I \oplus D_1^{II}$ outputs the other subset $D_1^{II}$. With both subsets $D_1^I$, $D_1^{II}$, the computer 105 has a complete map $D_1$. Thus, by storing only the subset $D_1^I$ and receiving the map dataset $D_1^I \oplus D_1^{II}$ from the server 125, the computer 105 can recover the other subset $D_1^{II}$ and complete the map $D_1$, reducing the amount of memory used by maps in the computer 105. Alternatively, the server 125 can divide the maps into more than two subsets, e.g., three subsets, four subsets, etc.

Figure 5:
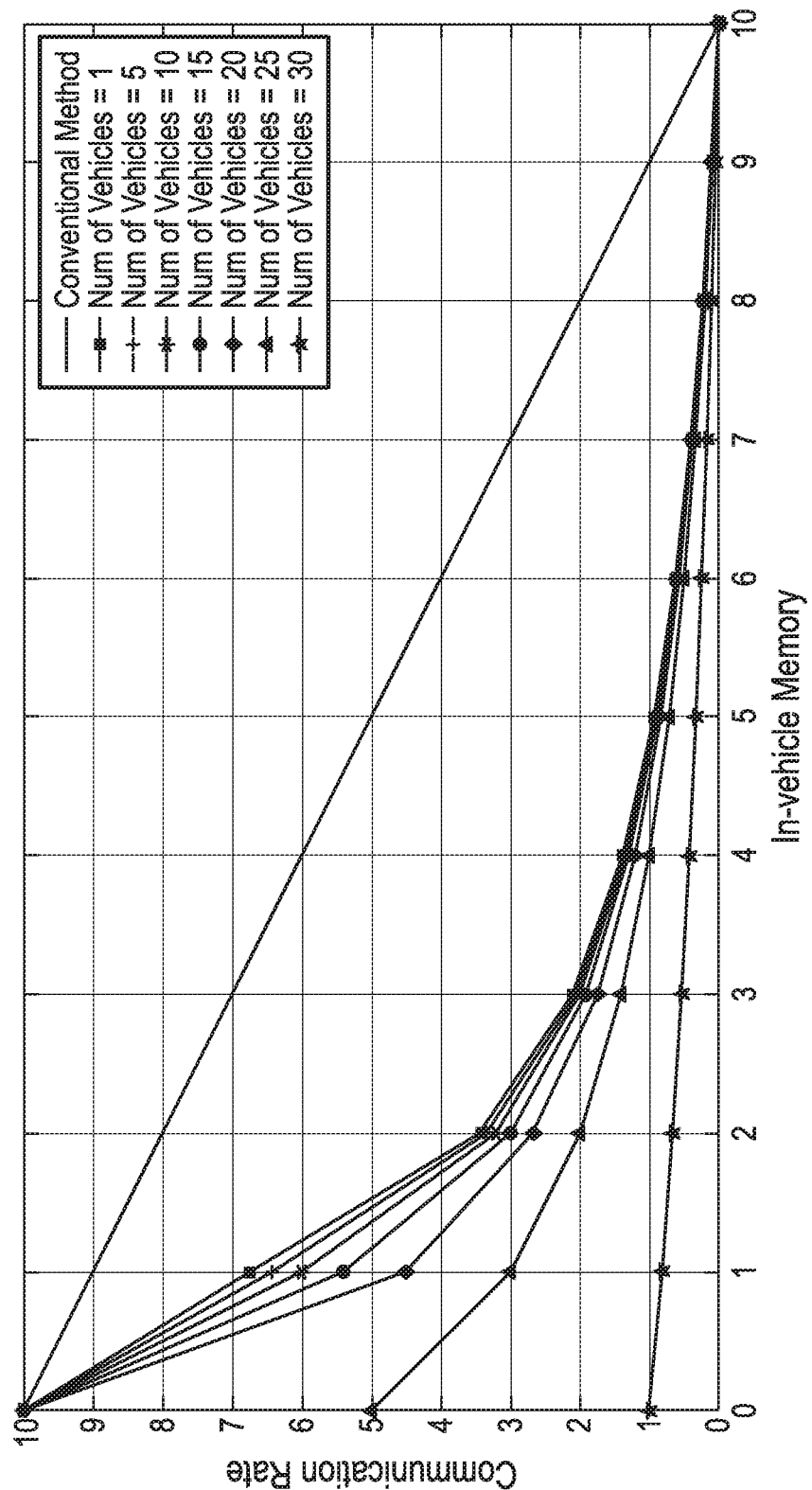
FIG. 5 is a chart of data communication rates and memory storage.

Advantages of reducing memory and bandwidth consumption are shown in the diagram of FIG. 5. FIG. 5 shows the predicted communication rate and memory usage for a specified number of datasets to different numbers of vehicles 101. The vertical Y-axis is the communication rate of the datasets over the network 120 in data per time, e.g., megabits per second. The horizontal X-axis is the amount of memory used in the computers 105 of the vehicles 101, e.g., in megabits. That is, FIG. 5 illustrates the communication rate required for a specified cache size of the computer 105. In a conventional method, this is a linear relationship, i.e., as cache size of the computer 105 increases, the communication rate decreases at a rate proportional to the increase of the cache size. Using subsets of maps and map datasets that are exclusive disjunctions of the subsets as described herein, the communication rate decreases more quickly than the increase in the cache size, shown by the symbols and lines in FIG. 5. For example, for a cache size of 3, the conventional method has a communication rate of 7, while, for 1-25 vehicles 101, the system 100 reduces the communication rate to between 1 and 2, and for 30 vehicles 101, the system 100 reduces the communication rate to below 1. Thus, the system 100 can reduce communication bandwidth consumption by about an order of magnitude compared to a conventional method, improving the data storage for the computers 105 and transmission over the network 120 by the server 125.

FIG. 2 shows two vehicles 101a, 101b in the first geographic area, Area 1. The first vehicle 101a includes a computer 105a that stores a subset $D_1^I$ of the first map $D_1$ and a subset $D_2^I$ of the second map $D_2$ assigned by the server 125. The combined data size (i.e., an amount of data measured in bits) of the assigned subsets $D_1^I$, $D_2^I$ stored by the computer 105a is smaller than a combined data size of the maps $D_1$, $D_2$, reducing the amount of memory space used by the computer 105a. A second vehicle 101b includes a computer 105b that stores a subset $D_1^{II}$ of the first map $D_1$ and a subset $D_2^{II}$ of the second map $D_2$ assigned by the server 125. The computers 105a, 105b each include limited maps $B_1$, $B_2$. The limited maps $B_1$, $B_2$ include limited information for vehicle 101a, 101b operation and take up less memory than the maps $D_1$, $D_2$. In the Figures, the Roman numeral I refers to the first vehicle 101a, and the Roman numeral II refers to the second vehicle 101b. The Figures show the first vehicle 101a and the second vehicle 101b as individual vehicles 101. Alternatively, the first vehicle 101a can be part of a first fleet including a plurality of first vehicles 101a, and the second vehicle 101b can be part of a second fleet including a plurality of second vehicles 101b.

Because both vehicles 101a, 101b lack their respective missing subset for the map $D_1$, the server 125 can transmit the map dataset $D_1^I \oplus D_1^{II}$ to the computer 105a, 105b. That is, the computer 105a lacks the subset $D_1^{II}$ to complete the map $D_1$, and the computer 105b lacks the subset $D_1^{II}$ to complete the map $D_1$, and the computers 105a, 105b can generate the missing subset from the map dataset $D_1^I \oplus D_1^{II}$. The computer 105a can generate the subset $D_1^{II}=(D_1^I \oplus D_1^{II}) \oplus D_1^I$, and the computer 105b can generate the subset $D_1^I=(D_1^I \oplus D_1^{II}) \oplus D_1^{II}$. Because the map dataset $D_1^I \oplus D_1^{II}$ is substantially the same size as one of the subsets $D_1^I$ or $D_1^{II}$, the bandwidth consumption to transmit the map dataset $D_1^I \oplus D_1^{II}$ is smaller than a bandwidth consumption to send either of the first map $D_1$ or the second map $D_2$. The server 125 can transmit only the map dataset to both computers 105a, 105b instead of sending the missing subset $D_1^{II}$ to the computer 105a and the missing subset $D_1^I$ to the computer 105b. That is, by identifying and sending only one dataset over the network 120 instead of identifying the specific subset $D_1^I$, $D_1^{II}$ for the vehicles 101a, 101b, the server 125 reduces bandwidth consumption to the computers 105a, 105b.

As the vehicles 101a, 101b move along respective routes, the server 125 can identify a new location of the first vehicle 101a and a new location of the second vehicle 101b, and when the geographic area of one of the first and second vehicles 101a, 101b changes, the server 125 can transmit a second map dataset over the network 120 to the first and second vehicles 101a, 101b. For example, when the first vehicle 101a is in the first geographic area, Area 1, and the second vehicle 101b in the second geographic area, Area 2, the server 125 can transmit a map dataset that is the exclusive disjunction $D_1^{II} \oplus D_2^I$ to the computers 105a, 105b. The computer 105a can generate the subset $D_1^{II}$ from the map dataset to complete the map $D_1$ with the stored subset $D_1^I$, i.e., $D_1^{II}=(D_1^{II} \oplus D_2^I) \oplus D_2^I$. The computer 105b can generate the subset M from the map dataset to complete the map $D_2$ with the stored subset $D_2^{II}$, i.e., $D_2^I=(D_1^{II} \oplus D_2^I) \oplus D_1^{II}$.

FIG. 3 is a view of the maps $D_1$, $D_2$ being connectivity maps specifying a number of wireless network access points 300, as described above. The geographic areas, Area 1 and Area 2, have different sizes (i.e., respective measured areas in square meters) because Area 2 has a higher density of wireless network access points 300 than Area 1. That is, Area 2 is a smaller geographic area than Area 1 because the density of wireless network access points 300 in Area 2 is greater than the density of wireless network access points 300 in Area 1. The vehicles 101a, 101b are in Area 2, so the server 125 can transmit the exclusive disjunction $D_2^I \oplus D_2^{II}$ over the network 120. The computers 105a, 105b can use the exclusive disjunction $D_2^I \oplus D_2^{II}$ to recover the second map $D_2$. That is, the computer 105a can generate the subset $D_2^{II}$ from the map dataset to complete the map $D_2$ with the stored subset $D_2^I$, i.e., $D_2^{II}=(D_2^{II} \oplus D_2^I) \oplus D_2^I$. The computer 105b can generate the subset $D_2^I$ from the map dataset to complete the map $D_2$ with the stored subset $D_2^{II}$, i.e., $D_2^I=(D_1^{II} \oplus D_2^I) \oplus D_1^{II}$.

Figure 4:
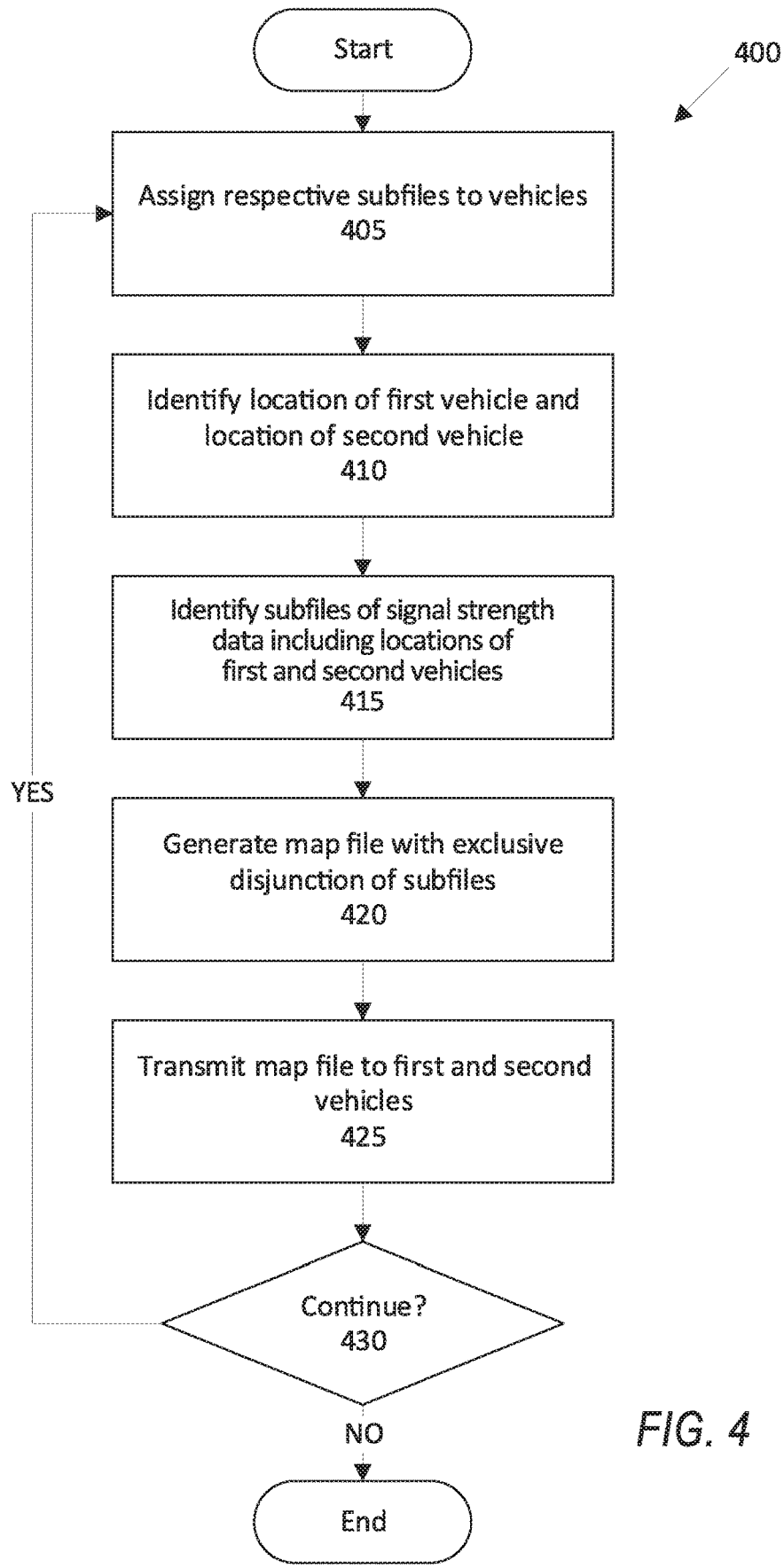
FIG. 4 is a diagram of an example process for operating the vehicle.

FIG. 4 is a block diagram of an example process 400 for operating a vehicle 101. The process 400 begins in a block 405, in which a server 125 allocates a plurality of connectivity maps into a plurality of subsets, each subset including some but not all of the data of its respective connectivity map. As described above, a connectivity map is a map of connectivity quality data. The connectivity quality data can be rates of data transmission of a communications network or a number of wireless network access points 300. The server 125 then allocates at least one subset of each connectivity map to each of a plurality of vehicles 101. By assigning the subsets to the vehicles 101, each vehicle 101 has only a portion of each connectivity map that is smaller than the entire respective connectivity map, reducing memory usage on a computer 105 of the respective vehicle 101.

Next, in a block 410, the server 125 identifies respective locations of a first vehicle 101a and a second vehicle 101b. The server 125 can compare geo-coordinate data of the first and second vehicles 101a, 101b to determine the respective geographic area (and corresponding connectivity map) that includes the respective location of the first and second vehicles 101a, 101b.

Next, in a block 415, the server 125 identifies the subsets of the connectivity maps including the locations of the first and second vehicles 101a, 101b that the computers 105a, 105b lack. As described above, each computer 105a, 105b includes less than all of the subsets of the connectivity maps, and the server 125 can identify, for each vehicle 101a, 101b, the respective subsets to complete the respective connectivity map including the location of the vehicle 101a, 101b. For example, in a first geographic area, the first vehicle 101a can have an assigned first subset $D_1^I$ stored in the computer 105a, and the server 125 can identify the second subset $D_1^{II}$ for the first vehicle 101a.

Next, in a block 420, the server 125 generates one or more map datasets, each map dataset being an exclusive disjunction of two of the identified subsets. As described above, an "exclusive disjunction" is the output of the XOR ("exclusive or") function for two subsets. That is, for two subsets $D_1^I$, $D_1^{II}$, the exclusive disjunction $D_1^I \oplus D_1^{II}$ is a dataset in which each bit takes a value of 1 when the respective bits of the subsets $D_1^I$, $D_1^{II}$ differ (i.e., one is 1 and the other is 0) or takes a value of 0 when the respective bits of the subsets $D_1^I$, $D_1^{II}$ are the same (i.e., both are 1 or both are 0). Thus, the exclusive disjunction $D_1^I \oplus D_1^{II}$ indicates all bits that differ between the subsets $D_1^I$, $D_1^{II}$.

Next, in a block 425, the server 125 transmits the map datasets to the first and second vehicles 101a, 101b over the network 120. As described above, by transmitting the map datasets instead of the connectivity maps, the server 125 reduces bandwidth consumption over the network 120. Upon transmission of the map datasets, the computers 105a, 105b can complete their respective connectivity maps and move the vehicles 101a, 101b along routes within the geographic areas.

Next, in a block 430, the server 125 determines whether to continue the process 400. For example, the server 125 can determine to continue the process 400 upon detecting that one of the vehicles 101 has moved into a different geographic area requiring a different connectivity map. If the server 125 determines to continue, the process 400 returns to the block 405. Otherwise, the process 400 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   allocate respective connectivity quality data of a geographic area to a first map or a second map, the connectivity quality data including rates of data transmission of a communications network at a plurality of locations in the geographic area or a number of wireless network access points in the geographic area, the first and second maps each describing a portion of the geographic area in which the respective connectivity quality data are within a predetermined range;
   assign a first one of a plurality of subsets of the first map, and a first one of a plurality of subsets of the second map, to a first vehicle, wherein the first one of a plurality of subsets of the first map and the first one of a plurality of subsets of the second map each include some but not all of the data of the respective first or second map;
   assign a different, second, one of the plurality of subsets of the first map, and a different, second, one of the plurality of subsets of the second map to a second vehicle;
   select a first vehicle map subset from the first one of the plurality of subsets of the first map and the first one of the plurality of subsets of the second map based on determining a location of the first vehicle, and whether one of the first or second maps includes the location of the first vehicle;
   select a second vehicle map subset from the second one of the plurality of subsets of the first map and the second one of a plurality of subsets of the second map based on determining a location of the second vehicle, and whether one of the first or second maps includes the location of the second vehicle; and
   send, to the first vehicle and the second vehicle, a map dataset that is a result of applying an exclusive OR (XOR) function to (1) the first vehicle map subset and (2) the second vehicle map subset.

2. The system of claim 1, wherein the connectivity quality data include rates of data transmission of a second communications network, and the instructions further include instructions to send the map dataset based on the connectivity quality data of the one of the communications network or the second communications network having a higher average rate of data transmission than the other of the communications network or the second communications network.

3. The system of claim 1, wherein the first vehicle includes a vehicle computer programmed to apply the XOR function to the map dataset and the first vehicle map subset stored in the vehicle computer, to recover data of the second vehicle map subset.

4. The system of claim 3, wherein the vehicle computer is further programmed to actuate at least one of a propulsion, a brake, or a steering to move the first vehicle according to the recovered data.

5. The system of claim 3, wherein the output of applying the XOR function to the map dataset and the first vehicle map subset is a different subset of the identified map that includes the location of the first vehicle, and the vehicle computer is further programed to combine the first vehicle map subset and the different subset to recover the first map or the second map.

6. The system of claim 3, wherein the second vehicle includes a second vehicle computer programmed to apply the XOR function to the map dataset and the second vehicle map subset of the identified map that includes the location of the second vehicle.

7. The system of claim 1, wherein a data size of the map dataset is smaller than a respective data size of the data of the first map or the data of the second map.

8. The system of claim 7, wherein a combined data size of the first vehicle map subset and the second vehicle map subset and the map dataset is smaller than a combined data size of the data of the first map and the data of the second map.

9. The system of claim 1, wherein a bandwidth consumption to transmit the map dataset is smaller than a respective bandwidth consumption to transmit the first map or the second map.

10. The system of claim 1, wherein the instructions further include instructions to determine a new location of the first vehicle and a new location of the second vehicle, re-assign the first vehicle map subset and the second vehicle map subset based on the new location of the first vehicle and the new location of the second vehicle, respectively, and to send a second map dataset that is output from applying the XOR function to (1) the re-assigned first vehicle map subset and (2) the re-assigned second vehicle map subset.

11. The system of claim 1, wherein a size of the portion of the geographic area of the first map is based on the connectivity quality data of the geographic area.

12. The system of claim 11, wherein the number of wireless network access points in the first map is fewer than the number of wireless network access points of the second map, and the size of the portion of the geographic area of the first map is greater than a size of the portion of the geographic area of the second map.

13. A method, comprising:
allocating respective connectivity quality data of a geographic area to a first map or a second map, the connectivity quality data including rates of data transmission of a communications network at a plurality of locations in the geographic area or a number of wireless network access points in the geographic area, the first and second maps each describing a portion of the geographic area in which the respective connectivity quality data are within a predetermined range;
assigning a first one of a plurality of subsets of the first map, and a first one of a plurality of subsets of the second map, to a first vehicle, wherein the first one of a plurality of subsets of the first map and the first one of a plurality of subsets of the second map each include some but not all of the data of the respective first or second map;
assigning a different, second, one of the plurality of subsets of the first map, and a different, second, one of the plurality of subsets of the second map to a second vehicle;
selecting a first vehicle map subset from the first one of the plurality of subsets of the first map and the first one of a plurality of subsets of the second map based on determining a location of the first vehicle, and whether one of the first or second maps includes the location of the first vehicle;
selecting a second vehicle map subset from the second one of the plurality of subsets of the first map and the second one of a plurality of subsets of the second map based on determining a location of the second vehicle, and whether one of the first or second maps includes the location of the second vehicle; and
sending, to the first vehicle and the second vehicle, a map dataset that is a result of applying an exclusive OR (XOR) function to (1) the first vehicle map subset and (2) the second vehicle map subset.

14. The method of claim 13, wherein the connectivity quality data include rates of data transmission of a second communications network, and the method further includes sending the map dataset based on the connectivity quality data of the one of the communications network or the second communications network having a higher average rate of data transmission than the other of the communications network or the second communications network.

15. The method of claim 13, wherein the first vehicle includes a vehicle computer programmed to apply the XOR function to the map dataset and the first vehicle map subset stored in the vehicle computer, to recover data of the second vehicle map subset.

16. The method of claim 13, wherein a data size of the map dataset is smaller than a respective data size of the data of the first map or the data of the second map.

17. The method of claim 13, wherein a bandwidth consumption to transmit the map dataset is smaller than a respective bandwidth consumption to transmit the first map or the second map.

18. The method of claim 13, further comprising determining a new location of the first vehicle and a new location of the second vehicle, re-assigning the first vehicle map subset and the second vehicle map subset based on the new location of the first vehicle and the new location of the second vehicle, respectively, and sending a second map dataset that is output from applying the XOR function to (1) the re-assigned first vehicle map subset and (2) the re-assigned second vehicle map subset.

19. The method of claim 13, wherein a size of the portion of the geographic area of the first map is based on the connectivity quality data of the geographic area.

20. The method of claim 19, wherein the number of wireless network access points in the first map is fewer than the number of wireless network access points of the second map, and the size of the portion of the geographic area of the first map is greater than a size of the portion of the geographic area of the second map.

* * * * *